(12) United States Patent
Ishigami et al.

(10) Patent No.: US 11,284,044 B2
(45) Date of Patent: Mar. 22, 2022

(54) IMAGE GENERATION DEVICE AND IMAGING DEVICE

(71) Applicant: nanolux co. ltd., Ibaraki (JP)

(72) Inventors: Koichiro Ishigami, Tsukuba (JP); Hirofumi Sumi, Tsukuba (JP); Motoshi Sobue, Tsukuba (JP)

(73) Assignee: NANOLUX CO. LTD., Ibaraki (JP)

( * ) Notice: Subject to any disclaimer, the term of this patent is extended or adjusted under 35 U.S.C. 154(b) by 0 days.

(21) Appl. No.: 17/251,215

(22) PCT Filed: Jul. 19, 2019

(86) PCT No.: PCT/JP2019/028470
§ 371 (c)(1),
(2) Date: Dec. 11, 2020

(87) PCT Pub. No.: WO2020/017638
PCT Pub. Date: Jan. 23, 2020

(65) Prior Publication Data
US 2021/0250556 A1    Aug. 12, 2021

(30) Foreign Application Priority Data

Jul. 20, 2018 (JP) .............................. JP2018-136621

(51) Int. Cl.
*H04N 9/04* (2006.01)
*G06T 5/00* (2006.01)
(Continued)

(52) U.S. Cl.
CPC ........... *H04N 9/0451* (2018.08); *G06T 5/003* (2013.01); *H04N 5/2173* (2013.01);
(Continued)

(58) Field of Classification Search
CPC .......... H04N 9/04553; H04N 9/04559; H04N 5/235; H04N 5/2355; H04N 5/33;
(Continued)

(56) References Cited

U.S. PATENT DOCUMENTS

| 8,854,472 B1 | 10/2014 | Nagamune |
| 2007/0070224 A1 | 3/2007 | Sasaki |
(Continued)

FOREIGN PATENT DOCUMENTS

| CN | 105432076 A | 3/2016 |
| JP | 2010161453 A | 7/2010 |
(Continued)

*Primary Examiner* — Paul M Berardesca
(74) *Attorney, Agent, or Firm* — Hauptman Ham, LLP

(57) ABSTRACT

An image generation device includes a first color signal generation unit that generates three or more types of first color signals Rl, Gl, and Bl by combining two or more types of near-infrared light signals $S_{IR1}$ and $S_{IR2}$ with three or more types of visible light signals $S_R$, $S_G$, and $S_B$ in arbitrary proportions. The visible light signals $S_R$, $S_G$, and $S_B$ are outputted from a solid-state imaging element, and the near-infrared light signals $S_{IR1}$ and $S_{IR2}$ are acquired simultaneously with the visible light signals $S_R$, $S_G$, and $S_B$. The near-infrared light signals $S_{IR1}$ and $S_{IR2}$ are a signal based on near-infrared light and a signal based on near-infrared light. The first color signal generation unit 1 changes combining proportions of the visible light signals $S_R$, $S_G$, and $S_B$ and the near-infrared light signals $S_{IR1}$ and $S_{IR2}$ according to quality and/or strengths of each light signal.

11 Claims, 13 Drawing Sheets

(51) Int. Cl.
    *H04N 5/217*    (2011.01)
    *H04N 5/225*    (2006.01)
    *H04N 5/235*    (2006.01)

(52) U.S. Cl.
    CPC ......... *H04N 5/2256* (2013.01); *H04N 5/2355* (2013.01); *H04N 9/04553* (2018.08); *H04N 9/04559* (2018.08); *G06T 2207/10024* (2013.01)

(58) Field of Classification Search
    CPC ......... H04N 5/332; G06T 5/001; G06T 5/003; G06T 5/004; G06T 5/007–009
    See application file for complete search history.

(56)    References Cited

U.S. PATENT DOCUMENTS

| | | |
|---|---|---|
| 2013/0002882 A1 | 1/2013 | Onozawa et al. |
| 2016/0182837 A1 | 6/2016 | Shiokawa et al. |
| 2018/0040108 A1* | 2/2018 | Tanaka ................... G02B 5/208 |
| 2019/0020831 A1* | 1/2019 | Hsieh ................... H04N 5/2258 |
| 2019/0228512 A1* | 7/2019 | Kurihara ................. H04N 9/78 |
| 2020/0204717 A1* | 6/2020 | Yamamoto ............ H04N 5/2351 |

FOREIGN PATENT DOCUMENTS

| | | |
|---|---|---|
| JP | 2011233983 A | 11/2011 |
| WO | 2011013765 A1 | 2/2011 |

\* cited by examiner

FIG. 13A

| R | IR1 | G | IR3 |
|---|---|---|---|
| IR1 | R | IR3 | G |
| G | IR3 | B | IR2 |
| IR3 | G | IR2 | B |

FIG. 13B

| R | R+IR1 | G | G+IR2 |
|---|---|---|---|
| R+IR1 | R | G+IR2 | G |
| G | G+IR2 | B | B+IR2 |
| G+IR2 | G | B+IR2 | B |

FIG. 13C

| R | G |
|---|---|
| G | B |

| R+IR1 | G+IR2 |
|---|---|
| G+IR2 | B+IR2 |

FIG. 13D

| R | G |
|---|---|
| G | B |

| IR1 | IR2 |
|---|---|
| IR2 | IR2 |

FIG. 14

| R   | G   | IR1 | IR3 | R   | G   | IR1 | IR3 |
|-----|-----|-----|-----|-----|-----|-----|-----|
| G   | B   | IR3 | IR2 | G   | B   | IR3 | IR2 |
| IR1 | IR3 | R   | G   | IR1 | IR3 | R   | G   |
| IR3 | IR2 | G   | B   | IR3 | IR2 | G   | B   |
| R   | G   | IR1 | IR3 | R   | G   | IR1 | IR3 |
| G   | B   | IR3 | IR2 | G   | B   | IR3 | IR2 |
| IR1 | IR3 | R   | G   | IR1 | IR3 | R   | G   |
| IR3 | IR2 | G   | B   | IR3 | IR2 | G   | B   |

IMAGE GENERATION DEVICE AND IMAGING DEVICE

RELATED APPLICATIONS

The present application is a National Phase of International Application Number PCT/JP2019/028470, filed Jul. 19, 2019, which claims priority to Japanese Application Number 2018-136621, filed Jul. 20, 2018.

TECHNICAL FIELD

The present invention relates to an image generation device that generates a color image from visible light and near-infrared light and an imaging device.

BACKGROUND ART

There has been proposed an image-taking device configured to detect infrared rays reflected off a subject or infrared rays radiated by the subject and form a color image of the subject (see PTL 1). The image-taking device disclosed in PTL 1 generates a color image from near-infrared light by utilizing a phenomenon where a subject spectral reflectivity characteristic which is similar to that of a visible wavelength region is found in a near-infrared wavelength region, too. Specifically, light in the near-infrared region that is highly correlative to a color produced when an identical subject is visually observed under visible light irradiation, and a display color is simulatively produced from the information thus detected. Utilizing this technology makes it possible to take a color image even in an extremely-low intensity environment or darkness.

Further, there have conventionally been proposed methods for, by utilizing near-infrared light, sharpening a color image taken under low illumination (see, for example, PTLs 2 and 3). PTL 2 discloses an imaging device configured to, by combining a monochromatic image taken through the use of an infrared lighting device and a color image taken with visible light, improves the contrast of a color image taken under low illumination. Meanwhile, PTL 3 discloses an imaging device configured to execute arithmetic processing separately on an infrared imaging signal and a visible light imaging signal in order to optimize the white balance and improve color reproducibility in infrared irradiation photographing.

CITATION LIST

Patent Literature

PTL 1: International Publication No. 2011/013765
PTL 2: Japanese Unexamined Patent Application Publication No. 2011-233983
PTL 3: Japanese Unexamined Patent Application Publication No. 2010-161453

SUMMARY OF INVENTION

Technical Problem

However, the imaging devices disclosed in PTLs 2 and 3 listed above, which obtain color information from visible light signals, are undesirably unable to take a color image in an environment where there is almost no visible light. On the other hand, the imaging device disclosed in PTL 1 is capable of taking an image even in darkness (0 lux), as it can generate a color image with near-infrared light alone, but has a problem with color reproducibility, as it sets a color based on a correlation with visible light.

To address these problems, the present invention has as an object to provide an image generation device and an imaging device that make it possible to generate a sharp color image with high color reproducibility even when the image is taken in an environment where there is no sufficient visible light.

Solution to Problem

According to the present invention, there is provided an image generation device including a first color signal generation unit that generates three or more types of first color signals by combining two or more types of near-infrared light signals with three or more types of visible light signals in arbitrary proportions, the three or more types of visible light signals being outputted from a solid-state imaging element and based on visible lights differing in wavelength or wavelength range from one another, the two or more types of near-infrared light signals being outputted from the solid-state imaging element and based on near-infrared lights differing in wavelength or wavelength range from each other, wherein the two or more types of near-infrared light signals are acquired simultaneously with the three or more types of visible light signals and include at least a first near-infrared light signal based on near-infrared light whose peak wavelength falls within a range of 700 to 870 nm and a second near-infrared light signal based on near-infrared light whose peak wavelength falls within a range of 870 to 2500 nm, and the first color signal generation unit changes combining proportions of the visible light signals and the near-infrared light signals according to quality and/or strengths of each light signal.

The first color signal generation unit may combine the three or more types of visible light signals and the two or more types of near-infrared light signals after having executed signal processing on these signals.

The image generation device according to the present invention may further include a signal separation unit that separates a light signal outputted from the solid-state imaging element into the visible light signals and the near-infrared light signals and outputs the visible light signals and the near-infrared light signals, and may be configured such that the visible light signals and the near-infrared light signals separated by the signal separation unit are inputted to the first color signal generation unit.

Further, the image generation device according to the present invention may further include: a second color generation unit that generates three or more types of second color signals from the three of more types of visible light signals outputted from the solid-state imaging element and two or more types of mixed light signals containing both components based on the two or more types of near-infrared light signals or the visible lights and components based on the near-infrared lights; and an image generation unit that generates a color image by combining the first color signals and the second color signals.

In that case, the second color signal generation unit generates three or more types of second color signals, for example, by adding the two or more types of near-infrared light signals or the mixed light signals to the three or more types of visible light signals.

Alternatively, the second color signal generation unit may generate the second color signals by selecting any of the visible light signals, the near-infrared light signals, and the mixed light signals.

Meanwhile, the image generation unit may add differences between the first color signals and the second color signals to the second color signals.

In so doing, the differences between the first color signals and the second color signals may also be added to the second color signals after having been subjected to a noise reduction process.

Further, the second color signals may be added to the first color signals after having been subjected to a sharpening process.

According to the present invention, there is provided an imaging device including the aforementioned image generation device and an imaging unit that converts visible light and near-infrared light received from a subject into electrical signals, respectively, the imaging unit including a solid-state imaging element that detects three or more visible lights differing in wavelength or wavelength range from one another and two or more near-infrared lights differing in wavelength or wavelength range from each other.

The imaging device of the present invention may further include a lighting unit that irradiates a subject with the two or more near-infrared lights.

Advantageous Effects of Invention

The present invention, which generates a color signal by combining three or more types of visible light signals and two or more types of near-infrared light signals under specific conditions, makes it possible to generate a sharp color image with high color reproducibility even in an environment where there is no sufficient visible light.

BRIEF DESCRIPTION OF DRAWINGS

FIGS. 13A to 13D illustrate diagrams showing example pixel arrangements of a solid-state imaging element.

FIG. 14 is a diagram showing another example pixel arrangement of the solid-state imaging element.

DESCRIPTION OF EMBODIMENTS

In the following, embodiments for carrying out the present invention are described in detail with reference to the accompanying drawings. It should be noted that the present invention is not limited to the embodiments described below.

First Embodiment

Figure 1:
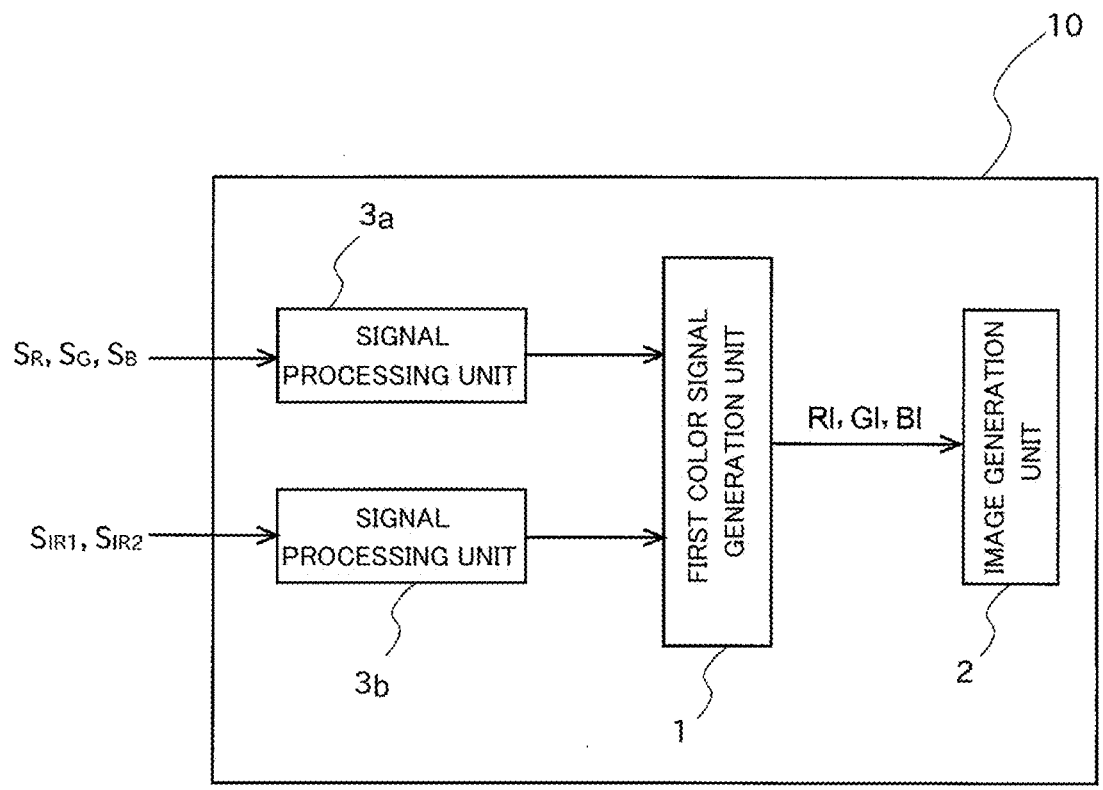
FIG. 1 is a block diagram showing a configuration of an image generation device of a first embodiment of the present invention.

First, an image generation device according to a first embodiment of the present invention is described. FIG. 1 is a block diagram showing a configuration of the image generation device of the present embodiment. As shown in FIG. 1, the image generation device 10 of the present embodiment serves to generate a color image from three or more types of visible light signals and two or more types of near-infrared light signals, includes a first color signal generation unit 1 and an image generation unit 2, and is provided with signal processing units 3a and 3b as needed.

[Light Signal]

Figure 2:
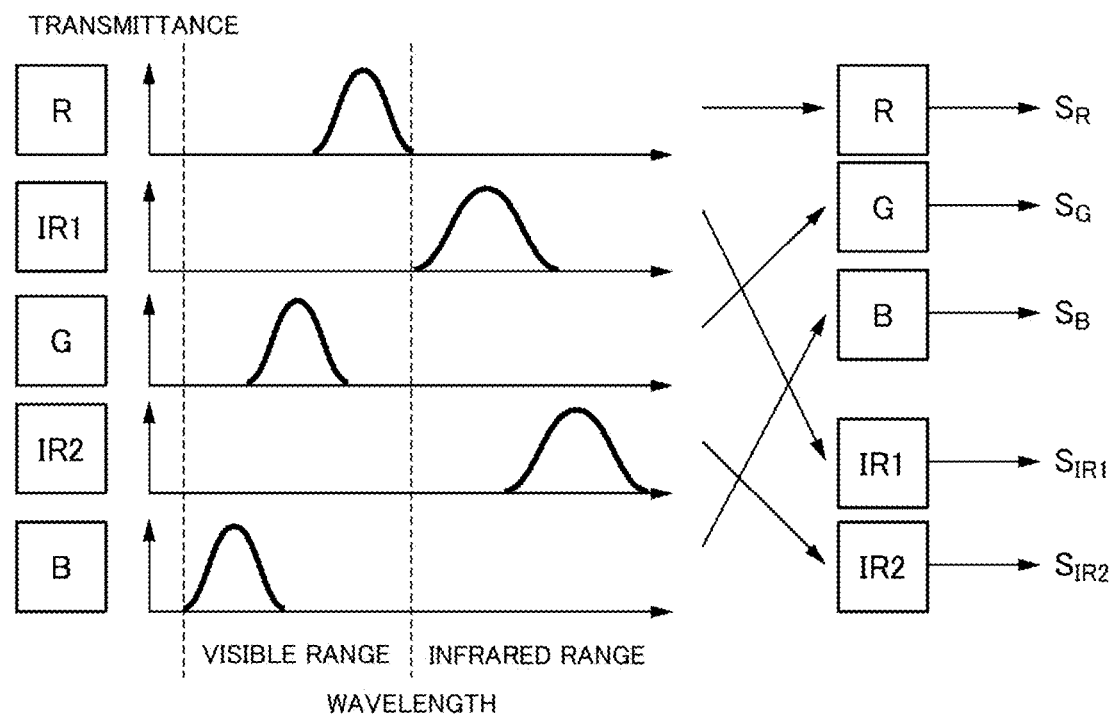
FIG. 2 is a diagram showing light signals that are inputted to the image generation device 10 shown in FIG. 1.

FIG. 2 is a diagram showing light signals that are inputted to the image generation device 10 shown in FIG. 1. As shown in FIG. 2, visible light signals $S_R$, $S_G$, and $S_B$ that are inputted to the image generation device 10 of the present embodiment are outputted from a solid-state imaging element and based on three types of visible light, detected by visible light pixels R, G, and B of the solid-state imaging element, that differ in wavelength or wavelength range from one another. Further, near-infrared light signals $S_{IR1}$ and $S_{IR2}$ are acquired simultaneously with the visible light signals $S_R$, $S_G$, and $S_B$ and based on two types of near-infrared light, detected by near-infrared pixels IR1 and IR2 of the solid-state imaging element, that differ in wavelength or wavelength range from each other.

Note here that the two or more types of near-infrared light signals include at least a first near-infrared light signal $S_{IR1}$ based on near-infrared light whose peak wavelength falls within a range of 700 to 870 nm and a second near-infrared light signal $S_{IR2}$ based on near-infrared light whose peak wavelength falls within a range of 870 to 2500 nm, preferably a range of 870 to 1100 nm. Since the use of these wavelength ranges of near-infrared light signals $S_{IR1}$ and $S_{IR2}$ makes it possible to approximately reproduce the spectral characteristics of visible light such as red light R and green light G, a color image with high color reproducibility can be obtained even in an environment where there is no sufficient visible light.

Although FIGS. 1 and 2 illustrates a case where three types of visible light signals and two types of near-infrared light signals are used, this is not intended to limit the present invention, and there need only be three or more types of visible light signals and two or more types of near-infrared light signals. Further, the present invention also encompasses a case where one or more of visible lights and near-infrared lights to be detected are not detected by the solid-state imaging element, and in that case, the visible light signal or near-infrared light concerned is treated as having a signal strength of 0.

[First Color Signal Generation Unit 1]

The first color signal generation unit 1 serves to generate three or more types of first color signals Rl, Gl, and Bl for use in the generation of a color image by combining the near-infrared light signals $S_{IR1}$ and $S_{IR2}$ with the visible light signals $S_R$, $S_G$, and $S_B$ in arbitrary proportions. In so doing, the proportions in which the visible light signals $S_R$, $S_G$, and $S_B$ and the near-infrared light signals $S_{IR1}$ and $S_{IR2}$ are combined change according to the quality of the light signals and/or the strengths (signal levels) of the light signals such as luminance and chroma levels (saturation) from the perspective of emphasis on color reproducibility.

For example, when the visible light signals $S_R$, $S_G$, and $S_B$ are low in quality or strength, when the near-infrared light signals $S_{IR1}$ and $S_{IR2}$ are high in quality or strength, or when the near-infrared light signals $S_{IR1}$ and $S_{IR2}$ are effective from a correlation between the visible light signals $S_R$, $S_G$, and $S_B$ and the near-infrared light signals $S_{IR1}$ and $S_{IR2}$, the proportions of near-infrared light signals $S_{IR1}$ and $S_{IR2}$ are increased. This makes a false color peculiar to near-infrared light less noticeable, making it possible to enhance the image quality of the color image to be generated and obtain a moving image with natural continuity ensured against a dynamic change in a subject. It should be noted that the proportions in which visible signals and near-infrared light signals are combined may be determined in consideration of the exposure value, the amount of irradiation with illuminating light, and the like in addition to the quality or strength of each light signal.

Further, a combining ratio in one image may be uniform throughout the image, but can also be locally varied. In the case of a uniform combining ratio throughout an image, the combining ratio can be determined, for example, through the use of the integral value of a certain pixel range or the like. In so doing, it is desirable that the pixel range fall within an effective region that is emphasized during an observation. However, in a case where it is difficult to provide the effective region with a detection unit for each response level, it is possible, as a simple alternative procedure, to provide a small-scale detection-dedicated region at an edge outside the effective pixels and make a determination from a result of detection in that region alone.

Meanwhile, in the case of different combining proportions for each pixel region, it is possible to determine a combining ratio through the use of responses from contiguous pixels or results obtained by locally executing filter processing on responses from surrounding pixels. The two types of pairs to be compared may involve the use of not only one set of pieces of information but also multiple sets, and may be converted into one representative piece of component ratio information by a arbitrarily weighted average or the like for use.

Furthermore, in a case where the combining proportions are locally modulated, the quality of the whole image to be finally obtained can be optimized, for example, by imparting an independently different combining ratio to each pixel. In a case where an independently different combining ratio is imparted to each pixel, the near-infrared signals can compensate for deficiency in the amount of visible light, although there are disadvantages such as higher computation load and cost. Since the amount of irradiation with visible light is not necessarily uniform within a photographing angle of view, varying combining ratios for each location and region makes it possible to compensate for visible light responses and suppress excess or deficiency throughout the image, thus leading to adequate image quality.

[Image Generation Unit 2]

The image generation unit 2 generates a color image from the first color signals Rl, Gl, and Bl generated by the first color signal generation unit 1. In so doing, the image generation unit 2 performs developing processes such as white balance (WB), image interpolation (ITP), color correction, tone correction, and noise reduction (NR) as needed.

[Signal Processing Units 3a and 3b]

Figure 3:
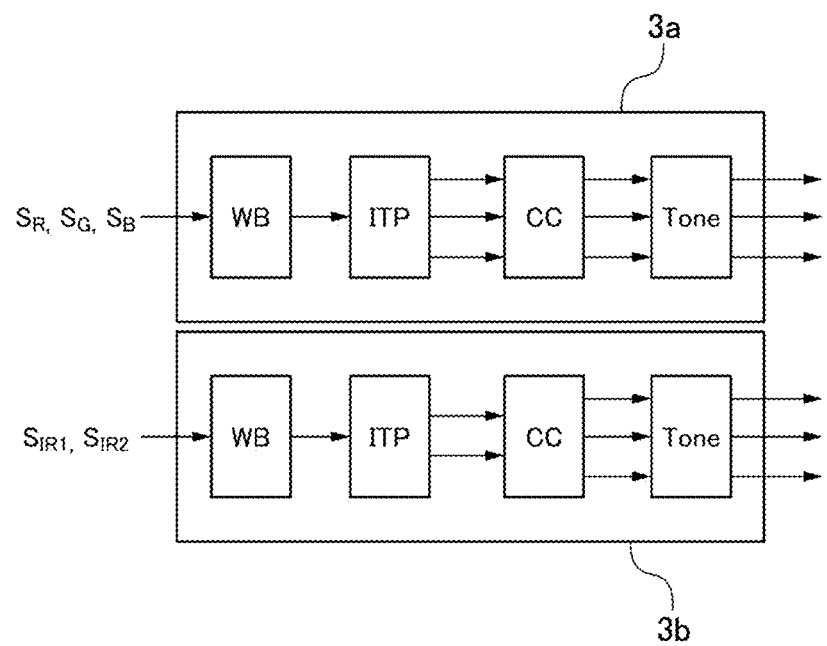
FIG. 3 is a block diagram showing an example configuration of signal processing units 3a and 3b shown in FIG. 1.

The image generation device 10 of the present embodiment may be provided with, in addition to the aforementioned constituent elements, the signal processing units 3a and 3b, which executes various types of signal processing on the visible light signals $S_R$, $S_G$, and $S_B$ and the near-infrared light signals $S_{IR1}$ and $S_{IR2}$, which are inputted to the first color signal generation unit 1. FIG. 3 is a block diagram showing an example configuration of the signal processing units 3a and 3b. As shown in FIG. 3, the signal processing units 3a and 3b are each provided with a white balance adjustment unit WB, an image interpolation processing unit ITP, a color correction processing unit CC, a tone correction unit Tone, or other constituent elements.

The white balance adjustment unit WB trims the levels of the visible light signals $S_R$, $S_G$, and $S_B$ and the near-infrared light signals $S_{IR1}$ and $S_{IR2}$ so that an achromatic surface of the subject is expressed as an achromatic color. In so doing, in a case where there are three types of near-infrared light signals, they need only be treated as a red color R, a green color G, and a blue color B, respectively; however, in a case where there are two types of near-infrared light signals as shown in FIG. 3, for example, the near-infrared light signals $S_{IR1}$ and $S_{IR2}$ need only be treated as a red color (R) and a green color (G), respectively, and it needs only be deemed that there is no blue color (B).

The image interpolation processing unit ITP obtains three types of red color (R), green color (G), and blue color (B) signals for all pixel locations by performing interpolation computations on signals differing in pixel location for each type of color filter (i.e. signals differing in type of color filter for each pixel location). Note here that in a case where there are two types of near-infrared light signals, the near-infrared light signals $S_{IR1}$ and $S_{IR2}$ need only be treated as a red color (R) and a green color (G), respectively, and it needs only be deemed that there is no blue color (B), as is the case with the aforementioned white balance.

The color correction processing section CC makes color corrections, for example, through 3×3 linear matrix operations. In so doing, the colors of various subjects can be appropriately expressed by adjusting linear matric coefficients. Specifically, coefficients are determined separately for each of the visible light signals $S_R$, $S_G$, and $S_B$ and the near-infrared light signals $S_{IR1}$ and $S_{IR2}$ so that the intended color reproducibility is attained, and the coefficients are used to perform calculations according to Mathematical Formulas 1 and 2 as follows:

$$\begin{bmatrix} R \\ G \\ B \end{bmatrix} = \begin{bmatrix} m_{RR} & m_{GR} & m_{BR} \\ m_{RG} & m_{GG} & m_{BG} \\ m_{RB} & m_{GB} & m_{BB} \end{bmatrix} \begin{bmatrix} S_R \\ S_G \\ S_B \end{bmatrix} \quad \text{[Math. 1]}$$

$$\begin{bmatrix} R \\ G \\ B \end{bmatrix} = \begin{bmatrix} m_{RR} & m_{GR} \\ m_{RG} & m_{GG} \\ m_{RB} & m_{GB} \end{bmatrix} \begin{bmatrix} S_{IR1} \\ S_{IR2} \end{bmatrix} \quad \text{[Math. 2]}$$

The tone correction unit Tone makes corrections to each light signal having a linear response characteristics with respect to the amount of light so that tones appropriate for an image are attained. Specifically, the tone correction unit Tone performs non-linear transformation on an input signal that is a linear response to the amount of light in accordance with a coding standard intended for display indication or the like. In the tone correction unit Tone, an intentional non-linear characteristic may be added to a transform characteristic (transform function) to correct or express the way in which an image looks, and various methods of operation may be applied to a transform process by using a mathematical formula or giving a one-dimensional numeric table to perform interpolations.

The processes that the signal processing units 3a and 3b perform are not limited to the aforementioned white balance, image interpolation, color correction, or tone correction, and in addition to or instead of these processes, processes such as black level correction (BL), color space conversion (CSC), and noise reduction (NR) may be performed. Further, the order of the processes is not limited to the order shown in FIG. 3, and implementation sites thereof may be set as appropriate.

Further, the visible light signals $S_R$, $S_G$, and $S_B$ and the near-infrared light signals $S_{IR1}$ and $S_{IR2}$ may be subjected to different processes, and some or all of these processes may be performed not on the visible light signals $S_R$, $S_G$, and $S_B$ and the near-infrared light signals $S_{IR1}$ and $S_{IR2}$, which are to be inputted to the first color signal generation unit 1, but on the first color signal Rl, Gl, and Bl, which have been outputted from the first color signal generation unit 1.

Figure 4:
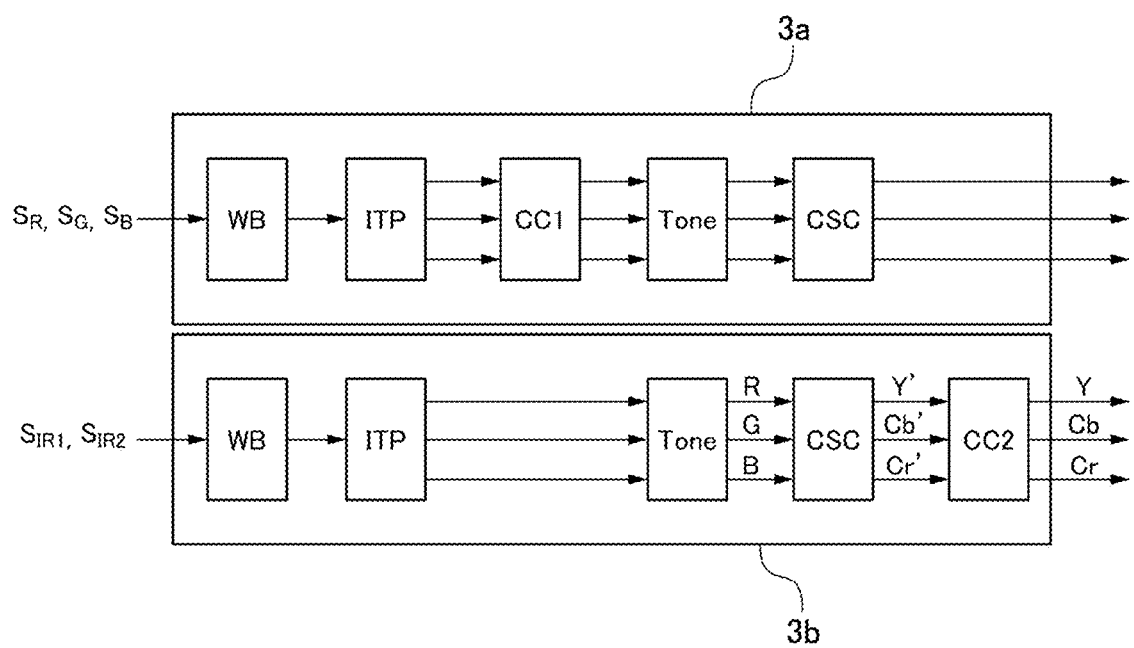
FIG. 4 is a block diagram showing another example configuration of the signal processing units 3a and 3b shown in FIG. 1.

FIG. 4 is a block diagram showing another example configuration of the signal processing units 3a and 3b. The near-infrared light signals outputted from the solid-state imaging element are less sufficient in color separation than the visible light signals and therefore converge in the vicinity of achromatic colors. Further, the near-infrared light signals are greatly different in state according to locations in a signal space (color space) and therefore complex in distribution. To address this problem, the image generation device of the present embodiment can bring about a definite correction effect on such light signals by configuring the signal processing units 3a and 3b as shown in FIG. 4.

Specifically, the signal processing unit 3a, which processes the visible light signals $S_R$, $S_G$, and $S_B$, is provided with a white balance adjustment unit WB, an image interpolation processing unit ITP, a color correction unit CC1, a tone correction unit Tone, and a color space conversion unit CSC in this order, and the signal processing unit 3b, which processes the near-infrared light signals $S_{IR1}$ and $S_{IR2}$, is provided with a white balance adjustment unit WB, an image interpolation processing unit ITP, a tone correction section Tone, a color space conversion unit CSC, and a color correction unit CC2 in this order.

The color space conversion unit CSC serves to convert the visible light signals and the near-infrared light signals into luminance chromaticity signals according to a matrix calculation shown in Mathematical Formula 3 below. The space into which the signals are converted is a virtual separate space for distinguishing coefficients for a next correction step, and is a temporary signal space (Y', Cb', Cr').

$$\begin{bmatrix} Y' \\ C'_b \\ C'_r \end{bmatrix} = \begin{bmatrix} a_{RY} & a_{GY} & a_{BY} \\ a_{Rb} & a_{Gb} & a_{Bb} \\ a_{Rr} & a_{Gr} & a_{Br} \end{bmatrix} \begin{bmatrix} R \\ G \\ B \end{bmatrix} \quad [\text{Math. 3}]$$

The coefficients in Mathematical Formula 3 above can be arbitrarily set, but for example in a case where Y' is adapted to the ITU-RBT.709 standard, are defined as follows:

$a_{RY}$=0.2126, $a_{GY}$=0.7152, $a_{BY}$=0.0722

$a_{Rb}$=−0.1146, $a_{Gb}$=−0.3854, $a_{Bb}$=0.5

$a_{Rr}$=0.5, $a_{Gr}$=−0.4542, $a_{Br}$=−0.0458

It should be noted that the process in the color space conversion unit CSC does not necessarily need to conform to the standards of output signals, but can also be adjusted to a space convenient for imparting a correction effect to each light signal. For example, the respective axes of Cb' and Cr' are assigned to the conditions B=G and R=G, respectively, it is only necessary to make changes as follows:

$a_{Rb}$=0, $a_{Gb}$=−0.5, $a_{Bb}$=0.5

$a_{Rr}$=0.5, $a_{Gr}$=−0.5, $a_{Br}$=0

The color correction unit CC2 serves to make color corrections to the luminance chromaticity signals $S_Y$, $S_{Cb}$, and $S_{Cr}$ subjected to color space conversion after tone correction, and for example, the color corrections are made using a matrix calculation formula shown in Mathematical Formula 4 as follows:

$$\begin{bmatrix} Y \\ C_b \\ C_r \end{bmatrix} = \begin{bmatrix} 1.0 & s_{bY} & s_{rY} \\ 0 & s_{bb} & s_{rb} \\ 0 & s_{br} & s_{rr} \end{bmatrix} \begin{bmatrix} Y' \\ C'_b \\ C'_r \end{bmatrix} \quad [\text{Math. 4}]$$

While there are 4×3 types of coefficients in Mathematical Formula 4 above, it is only necessary to select 2×3 types as follows with reference to the polarities of the input signals Cb' and Cr' at the time of application:

When Cb'≥0, $s_{bY}$=$s_{bY+}$, $s_{bb}$=$s_{bb+}$, $s_{br}$=$s_{br+}$
When Cb'<0, $s_{bY}$=$s_{bY−}$, $s_{bb}$=$s_{bb−}$, $s_{br}$=$s_{br−}$
When Cr'≥0, $s_{rY}$=$s_{rY+}$, $s_{rb}$=$s_{rB+}$, $s_{rr}$=$s_{rr+}$
When Cr'<0, $s_{rY}$=$s_{rY−}$, $s_{RB}$=$s_{rb−}$, $s_{rr}$=$s_{rr−}$ Further, in the settings of the coefficients, corrections are invalid with values such as those indicated below. However, by changing the coefficients from this state for adjustment, the colors of various subjects can be independently expressed to some extent even with a few parameter operations.

$s_{bY+}$=$s_{bY−}$=0, $s_{rY+}$=$s_{rY−}$=0

$s_{bb+}$=$s_{bb−}$=1.0, $s_{rb+}$=$s_{rb−}$=0

$s_{br+}$=$s_{br−}$=0, $s_{rr+}$=$s_{rr−}$=1.0

In this way, as for visible light, the signal processing units 3a and 3b shown in FIG. 4 make color corrections to the linear light signals $S_R$, $S_G$, and $S_B$ to be subjected to tone correction and, as for near-infrared light, make color corrections to the luminance chromaticity signals $S_Y$, $S_{Cb}$, and $S_{Cr}$ subjected to color space conversion after tone correction. This makes it possible to generate a color image with high color reproducibility even through the use of near-infrared light signals.

As described in detail above, the image generation device of the present invention, which uses three or more types of visible light signals and two or more near-infrared light signals simultaneously acquired by a solid-state imaging element and generates a color image from a color signal obtained by adjusting a combining ratio of these signals according to the quality and strengths of the signals, can give a sharp color image with high color reproducibility even when the image is taken in an environment where there is no sufficient visible light.

Moreover, the application of the image generation device of the present embodiment makes it possible to handle changes in brightness of a photographing environment by changing combining conditions through a developing system instead of changing photographing conditions (as to whether visible light photographing or near-infrared light photographing) through an imaging system. This makes it possible to achieve an imaging device that gives a high-quality color image regardless of the amount of visible light. The image generation device of the present embodiment is especially suitable to an imaging device, such as a surveillance camera, that takes a moving image for a long time.

First Modification of First Embodiment

Although the first embodiment has been described above by taking as an example a case where an imaging element is used in which visible light and near-infrared light are detected by different pixels, this is not intended to limit the present invention. Alternatively, the present invention may be applied to an imaging element in which visible light and near-infrared light are detected by an identical pixel.

Figure 5:
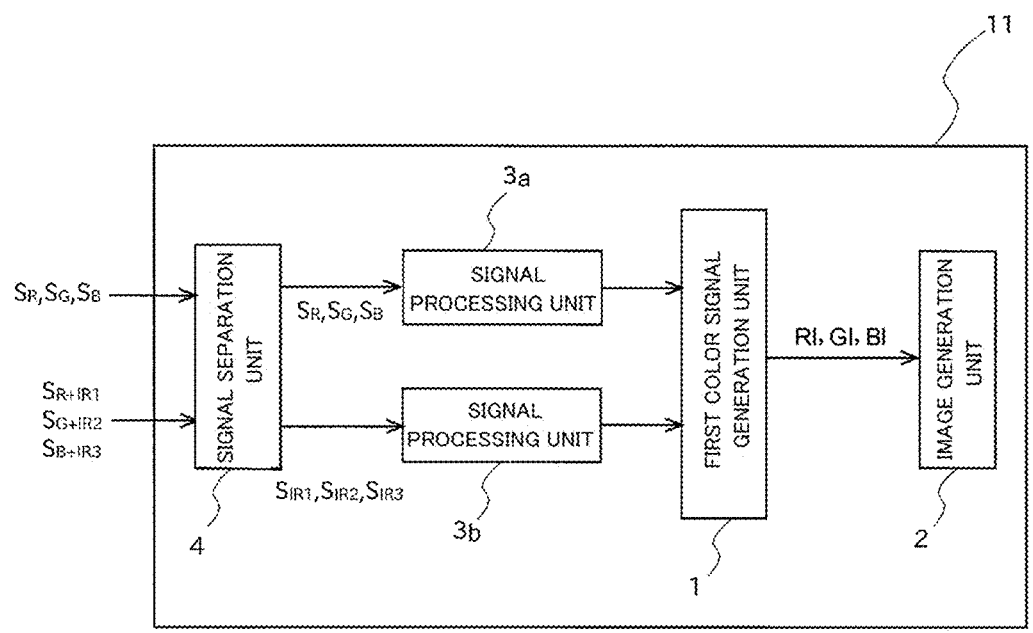
FIG. 5 is a block diagram showing a configuration of an image generation device of a first modification of the first embodiment of the present invention.

FIG. 5 is a block diagram showing a configuration of an image generation device of a first modification of the first embodiment of the present invention. In FIG. 5, constituent elements which are the same as those of the image generation device 10 shown in FIG. 1 are given the same reference signs, and a detailed description thereof is omitted. As shown in FIG. 5, the image generation device 11 of the present modification is provided with a signal separation unit 4 in addition to the first color signal generation unit 1, the image generation unit 2, and the signal processing units 3a and 3b.

[Signal Separation Unit 4]

The signal separation unit 4 serves to separate a light signal outputted from the solid-state imaging element into visible light signals and near-infrared light signals and output the visible light signals and the near-infrared light signals. In this signal separation unit 4, mixed optical signals $S_{R+IR1}$, $S_{G+IR2}$, and $S_{B+IR3}$, outputted from near-infrared light pixels of the solid-state imaging element, that contain both visible light components and near-infrared light components are separated into near-infrared light signals $S_{IR1}$, $S_{IR2}$, and $S_{IR3}$ and visible light signals $S_R$, $S_G$, and $S_B$.

Then, the visible light signals $S_R$, $S_G$, and $S_B$ thus separated are outputted together with the visible light signals $S_R$, $S_G$, and $S_B$ outputted from the visible light pixels, and are inputted to the signal processing unit 3a or the first color signal generation unit 1, and the near-infrared light signals $S_{IR1}$, $S_{IR2}$, and $S_{IR3}$ thus separated are inputted to the signal processing unit 3b or the first color signal generation unit 1. It should be noted that in a case where the near-infrared light pixels of the solid-state imaging element are configured to detect only near-infrared light, i.e. in a case where the solid-state imaging element does not output signals containing both visible light and near-infrared light, the signal separation unit 4 is not needed. Further, in a case where the solid-state imaging element detects two wavelengths (wavelength ranges) of near-infrared light, the signal separation unit 4 outputs two types of near-infrared light signals $S_{IR1}$ and $S_{IR2}$.

Even when configured such that the pixels of the solid-state imaging device detect both visible light and near-infrared light, the image generation device of the present modification, which includes the signal separation unit 4, makes it possible to generate a sharp color image with high color reproducibility even when the image is taken in an environment where there is no sufficient visible light, as is the case with the first embodiment described above. It should be noted that constituent elements and effects of the present modification other than those described above are the same as those of the first embodiment described above.

Second Embodiment

Figure 6:
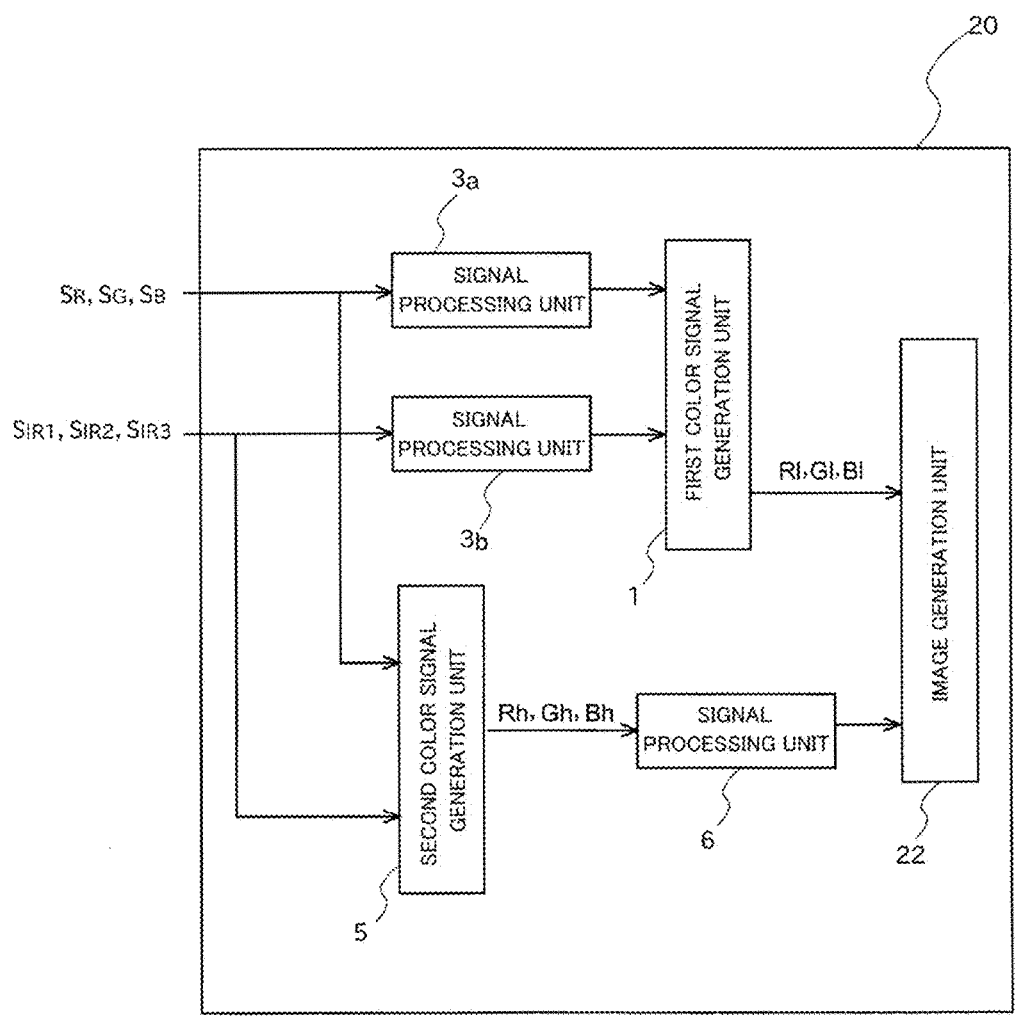
FIG. 6 is a block diagram showing a configuration of an image generation device of a second embodiment of the present invention.

Next, an image generation device according to a second embodiment of the present invention is described. FIG. 6 is a block diagram showing the image generation device of the present embodiment. In FIG. 6, constituent elements which are the same as those of the image generation device 10 shown in FIG. 1 are given the same reference signs, and a detailed description thereof is omitted. As shown in FIG. 6, the image generation device 20 of the present embodiment is provided with a second color signal generation unit 5 and a signal processing unit 6 in addition to the first color signal generation unit 1, an image generation unit 22, and the signal processing units 3a and 3b.

[Second Color Signal Generation Unit 5]

The second color signal generation unit 5 serves to generate second color signals Rh, Gh, and Bh from visible light signals $S_R$, $S_G$, $S_B$ and near-infrared light signals $S_{IR1}$, $S_{IR2}$, and $S_{IR3}$ outputted from the solid-state imaging element. While the aforementioned first color signal generation unit 1 combines visible light signals and near-infrared light signals with emphasis on color reproducibility, the second color signal generation unit 5 combines visible light signals and near-infrared light signals with emphasis on a signal-to-noise ratio (SN ratio).

Examples of methods for generating the second color signals Rh, Gh, and Bh include a method by which the visible light signals $S_R$, $S_G$, $S_B$ and the near-infrared light signals $S_{IR1}$, $S_{IR2}$, and $S_{IR3}$ are added together, a method by either the visible light signals $S_R$, $S_G$, $S_B$ or the near-infrared light signals $S_{IR1}$, $S_{IR2}$, and $S_{IR3}$ are selected, and similar methods.

[Signal Processing Unit 6]

Figure 7:
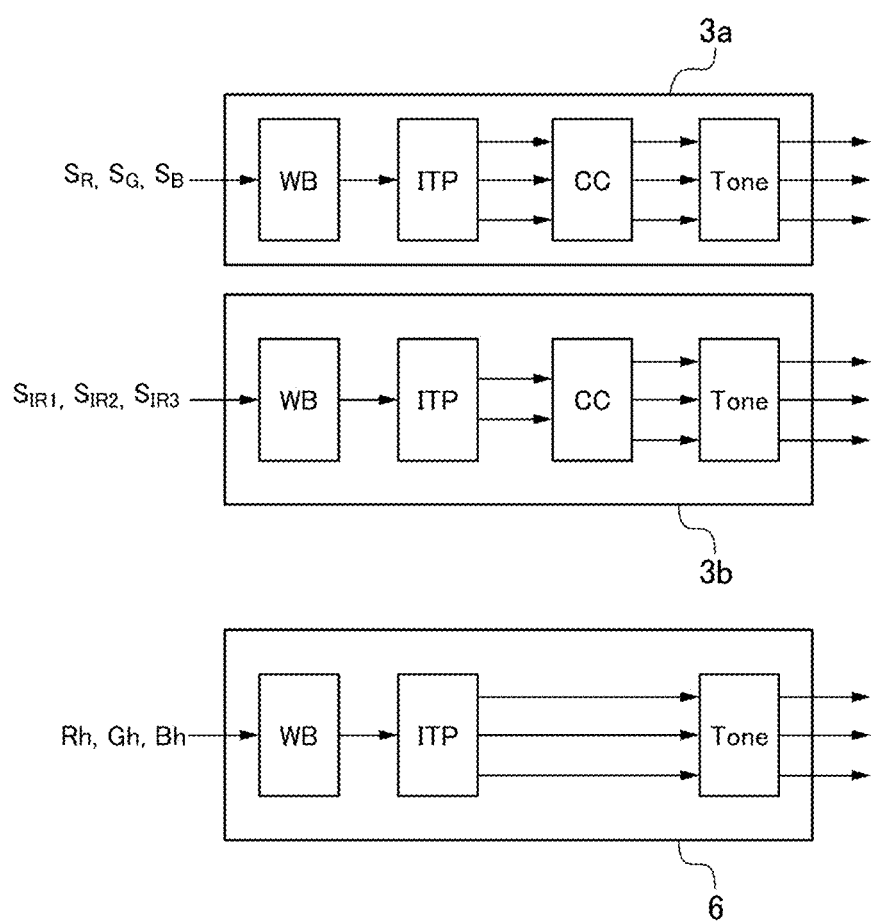
FIG. 7 is a block diagram showing an example configuration of a signal processing unit 6 shown in FIG. 6.

FIG. 7 is a block diagram showing an example configuration of the signal processing unit 6. As shown in FIG. 7, the signal processing unit 6 serves to execute various types of signal processing on the second color signals Rh, Gh, and Bh generated by the aforementioned second signal generation unit 5, and includes a white balance adjustment unit WB, an image interpolation processing unit ITP, a tone correction unit Tone, or other constituent elements. The white balance adjustment unit WB, the image interpolation processing unit ITP, the tone correction unit Tone are similar in processing to those of the aforementioned signal processing units 3a and 3b.

[Image Generation Unit 22]

The image generation unit 22 serves to generate a color image from the first color signals Rl, Gl, and Bl generated by the first color signal generation unit 1 with emphasis on color reproducibility and the second color signals Rh, Gh, and Bh generated by the second color signal generation unit 5 with emphasis on the SN ratio. In so doing, it is preferable to reduce noise contained in the first color signals Rl, Gl, and Bl with emphasis on color reproducibility and adjust the edge representation and sharpness of the second color signals Rh, Gh, and Bh with emphasis on the SN ratio.

Figure 8:
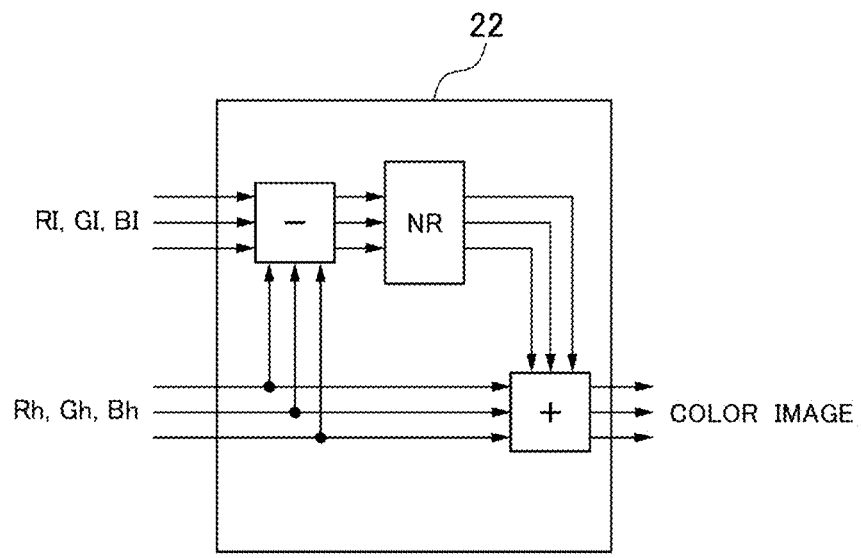
FIG. 8 is a block diagram showing an example configuration of an image generation unit 22 shown in FIG. 6.
Figure 9:
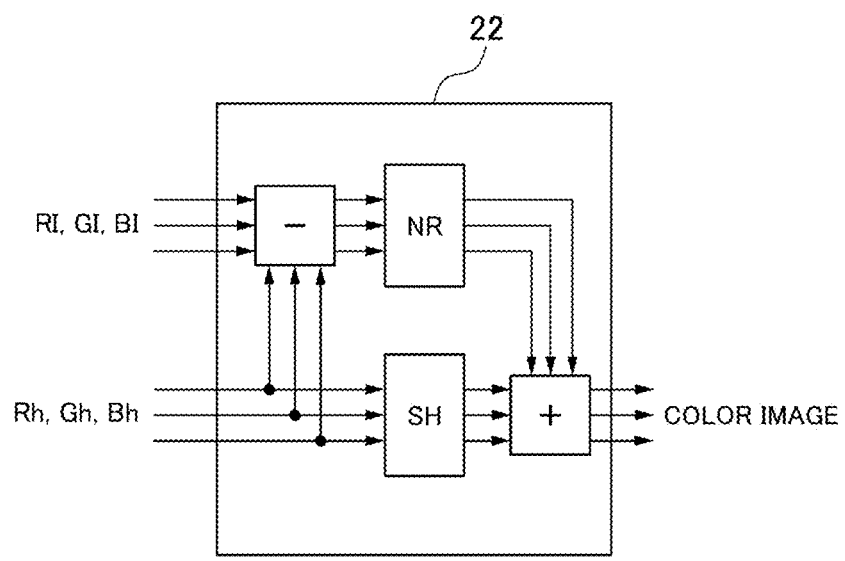
FIG. 9 is a block diagram showing another example configuration of the image generation unit 22 shown in FIG. 6.

FIGS. 8 and 9 are block diagrams each showing an example configuration of the image generation unit 22. For example, as shown in FIG. 8, the second image generation unit 22 takes differences between the first color signals Rl, Gl, and Bl and the second color signals Rh, Gh, and Bh and executes a noise reduction on these differences through a noise reduction processing unit NR. Then, a color image is obtained by adding the differences subjected to noise reduction to the second color signals Rh, Gh, and Bh again.

Alternatively, as shown in FIG. 9, a sharpening processing unit SH may be provided besides the noise reduction processing unit NR to execute a sharpening process such as edge reinforcement and sharpness on the second color signals Rh, Gh, and Bh. In this case, the differences subjected to noise reduction are added to the second color signals Rh, Gh, and Bh subjected to the sharpening process.

The first color signals Rl, Gl, and Bl with emphasis on color reproducibility contain comparatively much noise. This noise contained in the first color signals Rl, Gl, and Bl may be directly reduced from the input signals; however, as shown in FIGS. 8 and 9, the noise can be effectively reduced by performing a noise reduction process on the differences from the second color signals Rh, Gh, and Bh with emphasis on the SN ratio.

As described in detail above, the image generation device of the present embodiment, which generates the first color signals Rl, Gl, and Bl with emphasis on color reproducibility and the second color signals Rh, Gh, and Bh with emphasis on the SN ratio through the use of visible light signals and near-infrared light signals simultaneously acquired by the solid-state imaging element and generates a color image from these two types of signals, can give a sharp color image with high color reproducibility regardless of the amount of visible light. It should be noted that constituent elements and effects of the present modification other than those described above are the same as those of the first embodiment described above and the modification thereof.

First Modification of Second Embodiment

Although the second embodiment has been described above by taking as an example a case where an imaging element is used in which visible light and near-infrared light are detected by different pixels, this is not intended to limit the present invention. Alternatively, the present invention may be applied to an imaging element in which visible light and near-infrared light are detected by an identical pixel.

Figure 10:
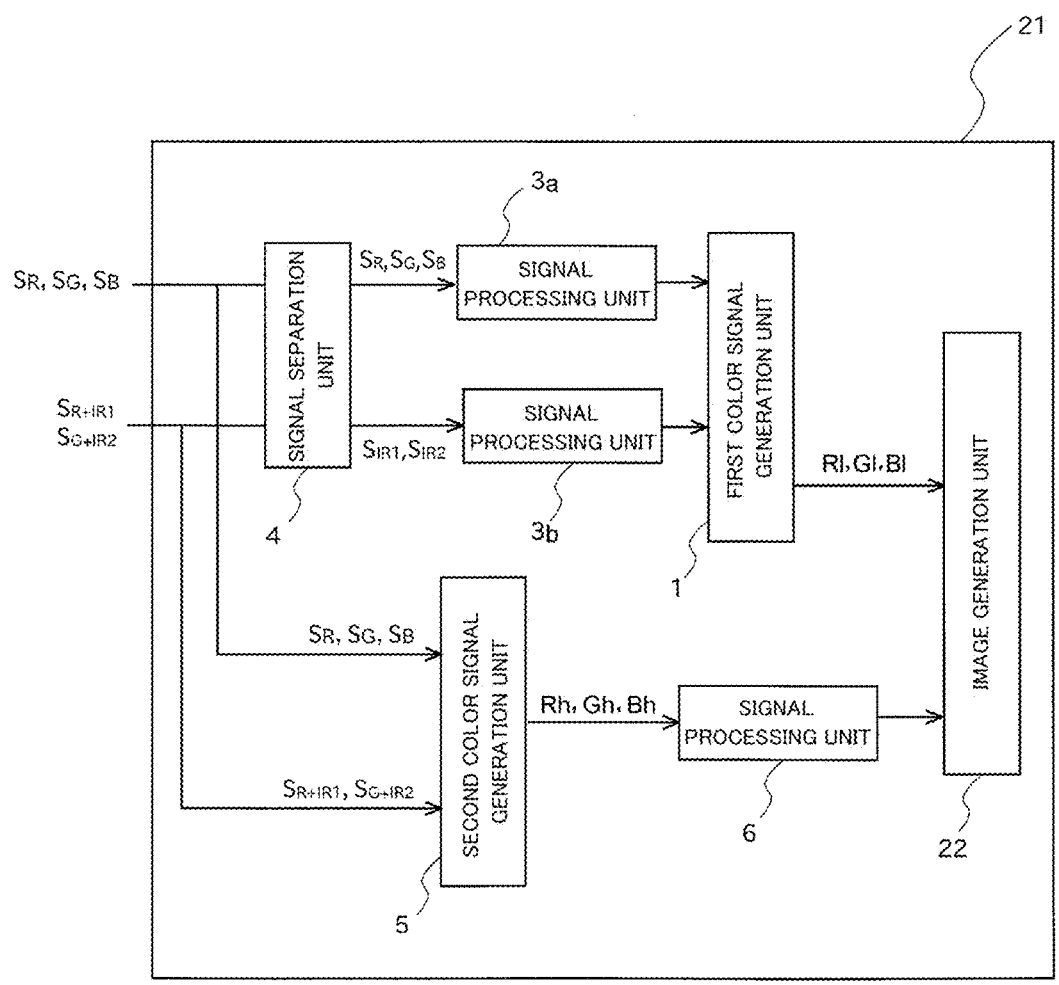
FIG. 10 is a block diagram showing a configuration of an image generation device of a first modification of the second embodiment of the present invention.

FIG. 10 is a block diagram showing a configuration of an image generation device of the present modification. It should be noted that in FIG. 10, constituent elements which are the same as those of the image generation device 20 shown in FIG. 6 are given the same reference signs, and a detailed description thereof is omitted. As shown in FIG. 10, the image generation device 21 of the present modification is the same as the image generation device 20 of the second embodiment described above, except that the signal separation unit 4 is provided in front of the signal processing units 3a and 3b.

Figure 11:
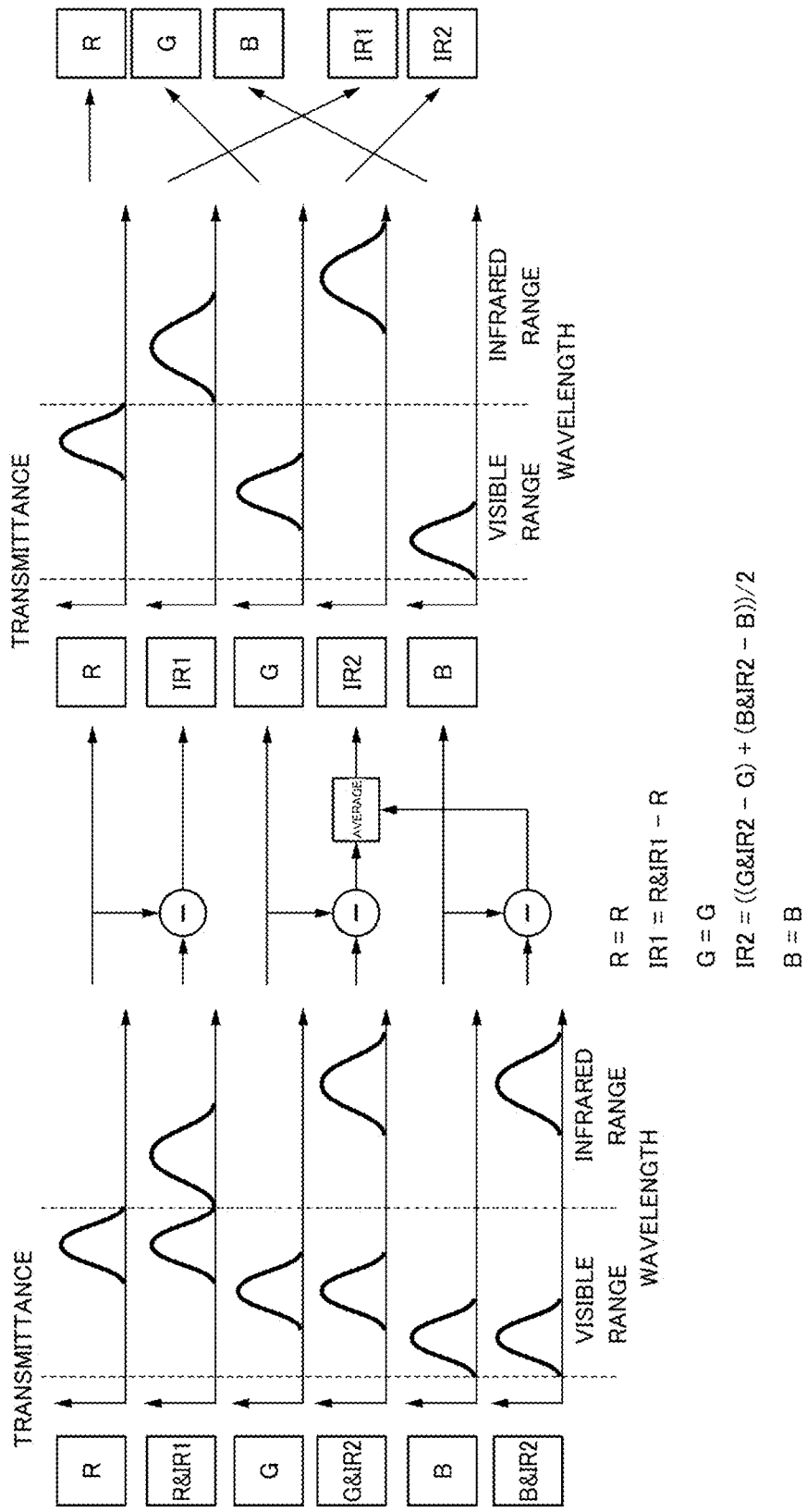
FIG. 11 is a diagram showing an example separation computation in a signal separation unit 4 shown in FIG. 10.

FIG. 11 is a diagram showing an example separation computation in the signal separation unit 4. For example, in a case where the solid-state imaging element has detected three wavelengths of visible light and two wavelengths of near-infrared light, visible light signals $S_R$, $S_G$, and $S_B$ and mixed light signals $S_{R+IR1}$, and $S_{G+IR2}$ containing both visible light components and near-infrared light components are inputted to the image generation device 21 as shown in FIG. 10. Then, these light signals are separated by the signal separation unit 4 into visible light signals $S_R$, $S_G$, and $S_B$ and near-infrared light signals $S_{IR1}$, and $S_{IR2}$.

In so doing, the separation into visible light signals and near-infrared light signals is not limited to a particular method, but for example, as shown in FIG. 11, the visible light signal $S_R$, which corresponds to red light R, the visible light signal $S_G$, which corresponds to green light G, and the visible light signal $S_B$, which corresponds to blue light B, are outputted as they are. Further, the near-infrared light signal $S_{IR1}$ is obtained by subtracting the visible light signal $S_R$ from the mixed light signal $S_{R+IR1}$, which contains a component corresponding to the red light R and a component corresponding to near-infrared light IR1.

Furthermore, the near-infrared light signal $S_{IR2}$ is obtained by taking the average of a signal obtained by subtracting the visible light signal $S_G$ from the mixed light signal $S_{G+IR2}$, which contains a component corresponding to the green light G and a component corresponding to near-infrared light IR2, and a signal obtained by subtracting the visible light signal $S_B$ from the mixed light signal $S_{B+IR2}$, which contains a component corresponding to the blue light B and the component corresponding to the near-infrared light IR2. Then, these five types of light signals are inputted to the first color signal generation unit 1 after having been subjected to signal processing as needed.

Meanwhile, the second color signal generation unit 5 generates second color signals Rh, Gh, and Bh from visible light signals $S_R$, $S_G$, and $S_B$ and mixed light signals $S_{R+IR1}$ and $S_{G+IR2}$ outputted from the solid-state imaging element. As in the case of the second embodiment described above, the second color signals Rh, Gh, and Bh may be generated by using a method by which the visible light signals $S_R$, $S_G$, $S_B$ and the mixed light signals $S_{R+IR1}$ and $S_{G+IR2}$ are added together, a method by either the visible light signals $S_R$, $S_G$, $S_B$ or the mixed light signals $S_{R+IR1}$ and $S_{G+IR2}$ are selected, or other methods.

It should be noted that constituent elements and effects of the image generation device of the present embodiment other than those described above are the same as those of the first embodiment described above, the first modification thereof, and the second embodiment described above.

Third Embodiment

Figure 12:
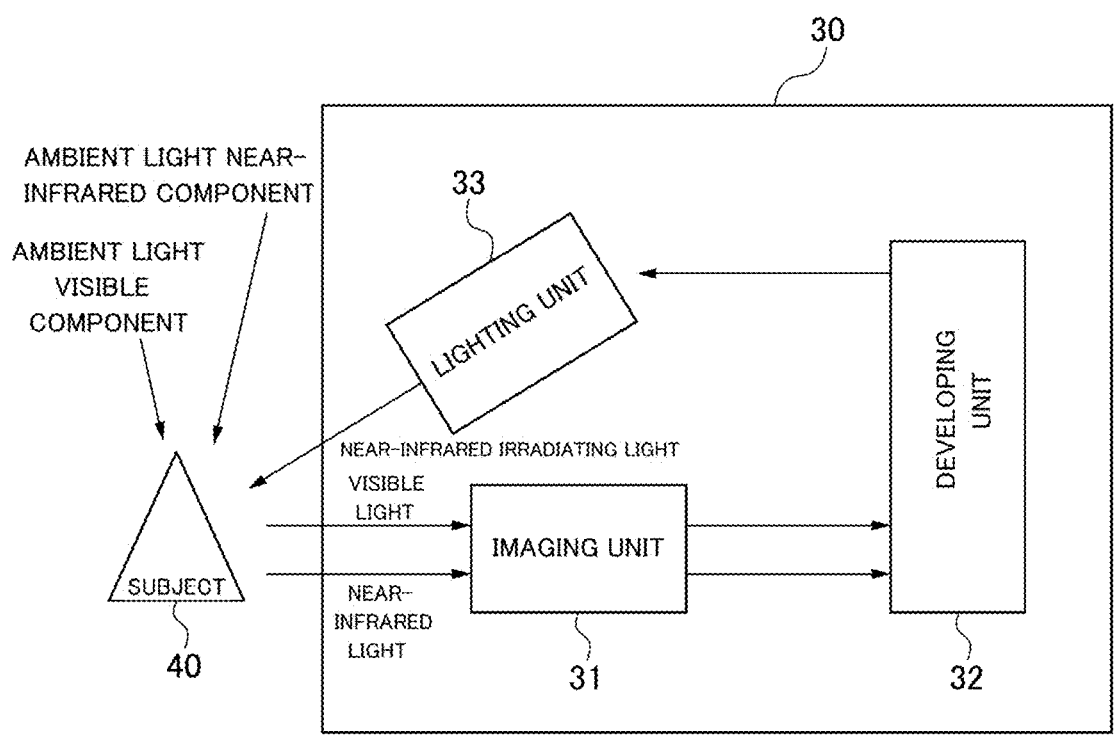
FIG. 12 is a block diagram showing a configuration of an imaging device of a third embodiment of the present invention.

Next, an imaging device according to a third embodiment of the present invention is described. FIG. 12 is a block diagram showing a configuration of the imaging device of the present embodiment. As shown in FIG. 12, the imaging device 30 of the present embodiment includes an imaging unit 31 and a developing unit 32, and the developing unit 32 is constituted by the aforementioned image generation device 10, 11, 20, or 21. Further, the imaging device 30 of the present embodiment may be provided with a lighting unit 33 that irradiates a subject 40 with two or more near-infrared lights.

[Imaging Unit 31]

The imaging unit 31 includes a solid-state imaging element that detects three or more visible lights differing in wavelength or wavelength range from one another and two or more near-infrared lights differing in wavelength or wavelength range from each other, and serves to convert visible light and near-infrared light received from a subject into electrical signals, respectively.

FIGS. 13A to 13D and FIG. 14 are diagrams showing example pixel arrangements of the solid-state imaging element. The solid-state imaging element is not limited to a particular pixel arrangement, but for example, in a case where visible light and near-infrared light are detected by separate pixels, the pixel arrangement shown in FIG. 13A may be adopted. Alternatively, in a case where visible light and near-infrared light are detected by an identical pixel, the pixel arrangement shown in FIG. 13B may be adopted.

Furthermore, the imaging unit 31 may be provided with a spectral element that splits reflected light from the subject 40, and visible light and near-infrared light may be detected by two or more solid-state imaging elements. In that case, for example, as shown in FIG. 13C, one solid-state imaging element may be configured to detect visible light, and the other solid-state imaging element may be configured to detect visible light and near-infrared light. Alternatively, as shown in FIG. 13D, one solid-state imaging element may be configured to detect only visible light, and the other solid-state imaging element may be configured to detect only near-infrared light.

Alternatively, as shown in FIG. 14, the imaging element of the imaging unit 31 may be configured such that a visible light detection region constituted by a red pixel R that detects red light, a blue pixel B that detects blue light, and two green pixels G that detect green light and a near-infrared light detection region constituted by a first near-infrared pixel IR1 that detects a first near-infrared light, a second near-infrared pixel IR2 that detects a second near-infrared light, and two third near-infrared pixels IR3 that detect a third near-infrared light are alternately arranged.

Figure 15A:
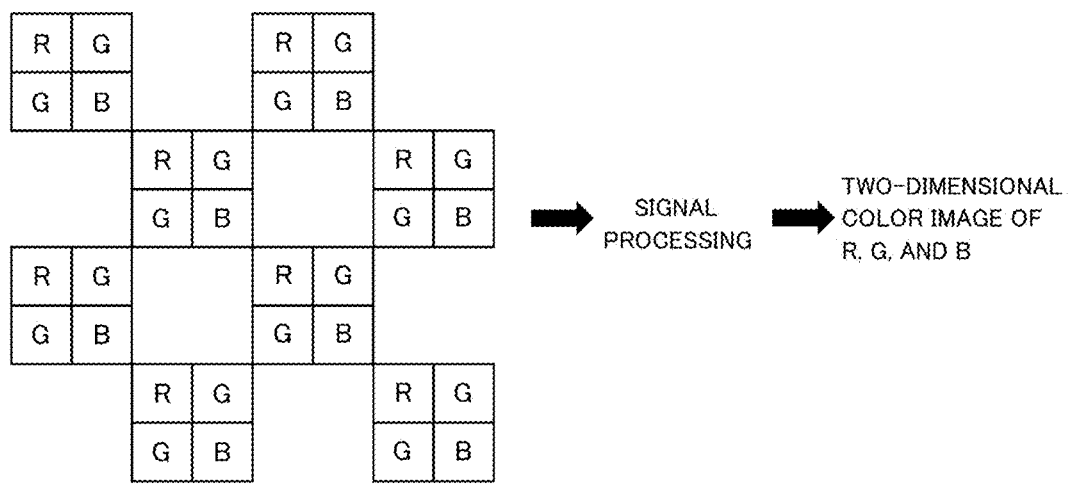
FIGS. 15A and 15B illustrate diagrams showing methods for generating a color image through the use of an imaging element of the pixel arrangement shown in FIG. 14, A showing a case where an image based on visible light is taken, B showing a case where an image based on near-infrared light is taken.
Figure 15B:
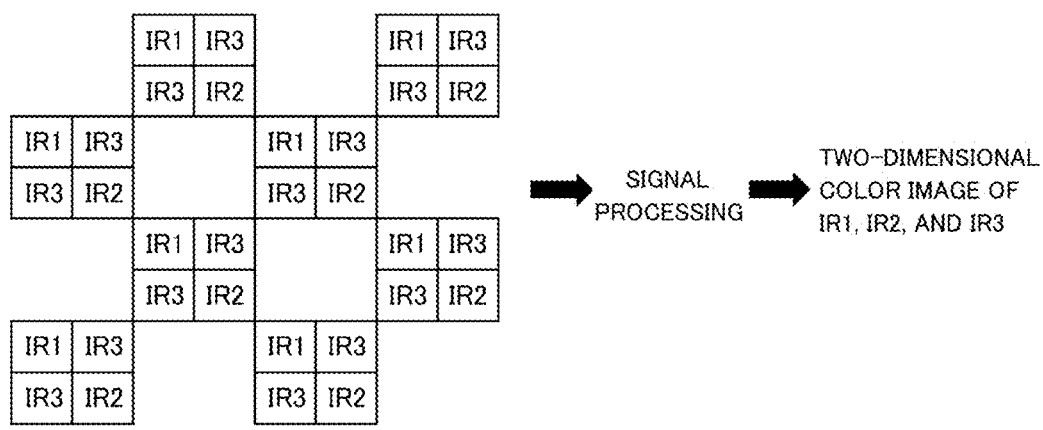

FIGS. 15A and 15B are diagrams showing methods for generating a color image through the use of an imaging element of the pixel arrangement shown in FIG. 14. FIG. 15A shows a case where an image based on visible light is taken, and FIG. 15B shows a case where an image based on near-infrared light is taken. In a case where a visible light color image is generated through the use of an imaging element of the pixel arrangement shown in FIG. 14, visible light signals $S_R$, $S_G$, $S_B$ based on light detected by the pixels R, G, and B of the visible light detection region shown in FIG. 15A are used. Specifically, a color image is generated by executing signal processing on the visible light signals $S_R$, $S_G$, $S_B$ outputted form the pixels R, G, and B, respectively, and combining near-infrared light signals $S_{IR1}$, $S_{IR2}$, and $S_{IR3}$ detected by the pixels IR1, IR2, and IR3 of the near-infrared light detection region as needed.

Further, in a case where a near-infrared light color image is generated through the use of an imaging element of the pixel arrangement shown in FIG. 14, near-infrared light signals $S_{IR2}$, $S_{IR2}$, and $S_{IR3}$ based on light detected by the pixels IR1, IR2, and IR3 of the near-infrared light detection region shown in FIG. 15B are used. Specifically, a color image is generated by executing signal processing on the near-infrared light signals $S_{IR1}$, $S_{IR2}$, and $S_{IR3}$ outputted from the pixels IR1, IR2, and IR3, respectively, and combining the visible light signals $S_R$, $S_G$, $S_B$ as needed.

Figure 16:
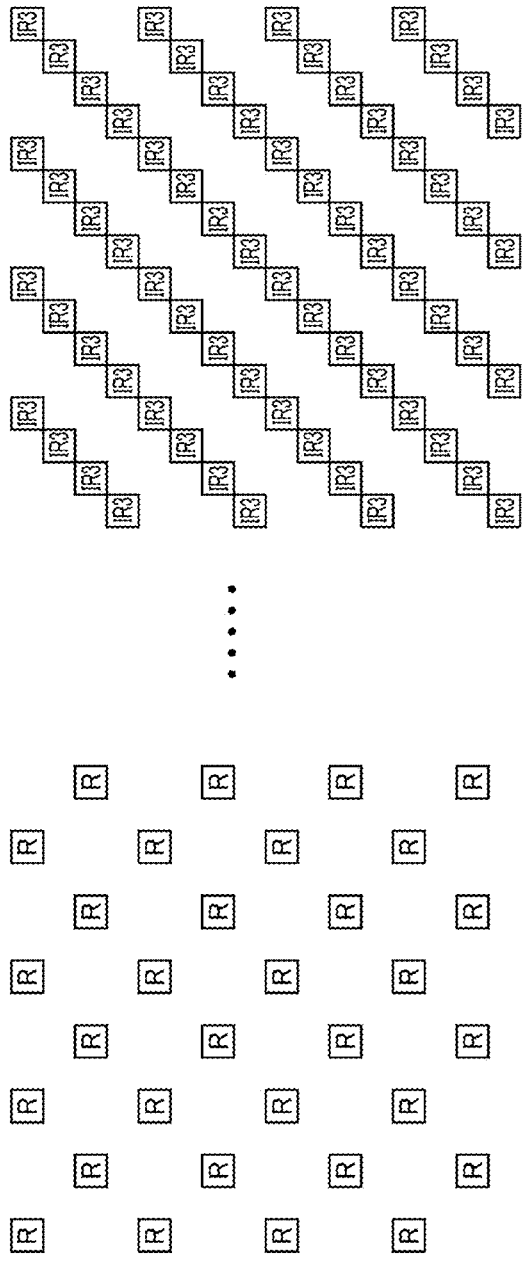
FIG. 16 is a diagram showing a method for generating a black-and-white image through the use of an imaging element of the pixel arrangement shown in FIG. 14.

FIG. 16 is a diagram showing a method for generating a black-and-white image through the use of an imaging element of the pixel arrangement shown in FIG. 14. The imaging device of the present embodiment can also generate a two-dimensional black-and-white image based on light of a specific wavelength as well as a color image. In a case where an imaging element of the pixel arrangement shown in FIG. 14 is used, it is possible to generate six types of images of red light, blue light, green light, and three types of near-infrared light of different wavelengths. In that case, for example, as shown in FIG. 16, a black-and-white image is generated by individually performing signal processing on the visible light signals $S_R$, $S_G$, and $S_B$ and the near-infrared light signals $S_{IR1}$, $S_{IR2}$, and $S_{IR3}$.

It should be noted that a solid-state imaging element for use in the imaging device of the present invention is not limited to that shown in FIGS. 13A to 13D or FIG. 14, but needs only be capable of detecting three or more visible lights differing in wavelength or wavelength range from one another and two or more near-infrared lights differing in wavelength or wavelength range from each other.

The imaging device of the present embodiment, which includes the aforementioned image generation device, can generate a sharp color image with high reproducibility regardless of the amount of visible light. Further, the imaging device of the present embodiment, which does not need to switch between visible light photographing and near-infrared light photographing according the brightness of a photographing environment, eliminates the need for a switching mechanism, a sensor for detecting brightness, or the like. It should be noted that constituent elements and effects of the imaging device of the present embodiment other than those described above are the same as those of the first and second embodiments described above.

The invention claimed is:

1. An image generation device comprising a first color signal generation unit that generates three or more types of first color signals by combining two or more types of near-infrared light signals with three or more types of visible light signals in arbitrary proportions, the three or more types of visible light signals being outputted from a solid-state imaging element and based on visible lights differing in wavelength or wavelength range from one another, the two or more types of near-infrared light signals being outputted from the solid-state imaging element and based on near-infrared lights differing in wavelength or wavelength range from each other, wherein the two or more types of near-infrared light signals are acquired simultaneously with the three or more types of visible light signals and include at least a first near-infrared light signal based on near-infrared light whose peak wavelength falls within a range of 700 to 870 nm and a second near-infrared light signal based on near-infrared light whose peak wavelength falls within a range of 870 to 2500 nm, and the first color signal generation unit changes combining proportions of the visible light signals and the near-infrared light signals according to quality and/or strengths of each light signal.

2. The image generation device according to claim 1, wherein the first color signal generation unit combines the three or more types of visible light signals and the two or more types of near-infrared light signals after having executed signal processing on these signals.

3. The image generation device according to claim 1, further comprising a signal separation unit that separates a light signal outputted from the solid-state imaging element into the visible light signals and the near-infrared light signals and outputs the visible light signals and the near-infrared light signals, wherein the visible light signals and the near-infrared light signals separated by the signal separation unit are inputted to the first color signal generation unit.

4. The image generation device according claim 1, further comprising:

a second color generation unit that generates three or more types of second color signals from the three of more types of visible light signals outputted from the solid-state imaging element and two or more types of mixed light signals containing both components based on the two or more types of near-infrared light signals or the visible lights and components based on the near-infrared lights; and an image generation unit that generates a color image by combining the first color signals and the second color signals.

5. The image generation device according to claim 4, wherein the second color signal generation unit generates three or more types of second color signals by adding the two or more types of near-infrared light signals or the mixed light signals to the three or more types of visible light signals.

6. The image generation device according to claim 4, wherein the second color signal generation unit generates the second color signals by selecting any of the visible light signals, the near-infrared light signals, and the mixed light signals.

7. The image generation device according to any one of claim 4, wherein the image generation unit adds differences between the first color signals and the second color signals to the second color signals.

8. The image generation device according to claim 7, wherein the differences between the first color signals and the second color signals are added to the second color signals after having been subjected to a noise reduction process.

9. The image generation device according to claim 7, wherein the second color signals are added to the first color signals after having been subjected to a sharpening process.

10. An imaging device comprising:
the image generation device according to claim 1, and
an imaging unit that converts visible light and near-infrared light received from a subject into electrical signals, respectively, the imaging unit including a solid-state imaging element that detects three or more visible lights differing in wavelength or wavelength range from one another and two or more near-infrared lights differing in wavelength or wavelength range from each other.

11. The imaging device according to claim 10, further comprising a lighting unit that irradiates a subject with the two or more near-infrared lights.

* * * * *